(12) United States Patent
Choi et al.

(10) Patent No.: US 11,768,548 B2
(45) Date of Patent: Sep. 26, 2023

(54) TOUCH PAD DEVICE AND PORTABLE COMPUTER COMPRISING SAME

(71) Applicant: HiDeep Inc., Seongnam-si (KR)

(72) Inventors: Hyukjae Choi, Seongnam-si (KR); Seyeob Kim, Seongnam-si (KR); Bonkee Kim, Seongnam-si (KR)

(73) Assignee: HiDeep Inc.

( * ) Notice: Subject to any disclaimer, the term of this patent is extended or adjusted under 35 U.S.C. 154(b) by 1 day.

(21) Appl. No.: 17/422,241

(22) PCT Filed: Jan. 21, 2020

(86) PCT No.: PCT/KR2020/000979
§ 371 (c)(1),
(2) Date: Jul. 12, 2021

(87) PCT Pub. No.: WO2020/166838
PCT Pub. Date: Aug. 20, 2020

(65) Prior Publication Data
US 2022/0091687 A1    Mar. 24, 2022

(30) Foreign Application Priority Data
Feb. 11, 2019   (KR) .......................... 10-2019-0015327

(51) Int. Cl.
*G06F 3/02*     (2006.01)
*G06F 3/0354*   (2013.01)
(Continued)

(52) U.S. Cl.
CPC ............ *G06F 3/03547* (2013.01); *G01L 1/22* (2013.01); *G06F 1/169* (2013.01)

(58) Field of Classification Search
CPC ........ G06F 3/03547; G06F 1/169; G06F 1/16; G06F 3/041; G06F 3/0414; G06F 3/0416;
(Continued)

(56) References Cited

U.S. PATENT DOCUMENTS

2006/0267961 A1* 11/2006 Onoda ................. G06F 1/1616
345/173
2011/0193813 A1* 8/2011 Gralewski ............... G06F 3/041
345/173
(Continued)

FOREIGN PATENT DOCUMENTS

KR    20100127616    12/2010
KR    101452302      10/2014
(Continued)

*Primary Examiner* — Lunyi Lao
*Assistant Examiner* — Jarurat Suteerawongsa
(74) *Attorney, Agent, or Firm* — The Belles Group, P.C.

(57) ABSTRACT

The present disclosure relates to a touch pad device and a portable computer including the same, and more particularly, to a touch pad device capable of sensing an inputted push of an object, and a portable computer including the same. A touch pad device according to one embodiment includes: a touch pad cover; a substrate disposed under the touch pad cover and including a pressure sensor; and a frame configured to support the substrate, in which a magnitude of a pressure inputted to the touch pad cover is detected on the basis of a change in electrical characteristics outputted from the pressure sensor in response to bending of the substrate.

12 Claims, 6 Drawing Sheets

(51) Int. Cl.
*G01L 1/22* (2006.01)
*G06F 1/16* (2006.01)
(58) Field of Classification Search
CPC ......... G06F 2203/04107; G06F 1/1662; G06F 3/016; G06F 3/02; G01L 1/22; G01L 1/142
See application file for complete search history.

(56) References Cited

U.S. PATENT DOCUMENTS

| | | | |
|---|---|---|---|
| 2019/0102011 A1* | 4/2019 | Schultz | G06F 3/04164 |
| 2019/0265834 A1* | 8/2019 | Rosenberg | G06F 3/03547 |
| 2019/0384441 A1* | 12/2019 | Seo | G06F 3/0414 |
| 2020/0341588 A1* | 10/2020 | Huang | G06F 3/0445 |
| 2021/0278946 A1* | 9/2021 | Rosenberg | G06F 3/04144 |

FOREIGN PATENT DOCUMENTS

| | | |
|---|---|---|
| KR | 20180057250 | 5/2018 |
| KR | 101865303 | 6/2018 |
| KR | 20180059447 | 6/2018 |
| WO | WO 2018096386 | 5/2018 |

* cited by examiner

TOUCH PAD DEVICE AND PORTABLE COMPUTER COMPRISING SAME

CROSS-REFERENCE TO RELATED PATENT APPLICATIONS

This patent application is a U.S. national stage application under 35 U.S.C. § 371 of PCT Application No. PCT/KR2020/000979, filed Jan. 21, 2020, which claims priority from Korean Patent Application No. 10-2019-0015327, filed Feb. 11, 2019. The disclosures of the aforementioned priority applications are incorporated herein by reference in their entireties.

TECHNICAL FIELD

The present disclosure relates to a touch pad device and a portable computer including the same, and more particularly, to a touch pad device capable of sensing an inputted push or pressure of an object, and a portable computer including the same.

BACKGROUND ART

In the case of a laptop computer, portability of which is critical, because it is inconvenient to carry a mouse separately, a pointing device integrated with a main body to serve as a mouse is required to be provided on the laptop computer.

Therefore, a touch pad, which may be substituted for the mouse and configured to control a pointer, is widely used. When a finger comes into contact with the touch pad, a sensor detects the contact portion and transfers information on the contact portion to the laptop computer, thereby moving a cursor of the mouse to a designated position. Further, a click button is provided at a lower end of the touch pad, such that when a user pushes the click button, it is possible to obtain an effect similar to that obtained by clicking a button of the mouse.

Among some laptop computers in the related art, there is a laptop computer in which a touch pad and a click button are integrated. A surface of the click button of the laptop computer also serves as a touch pad, and thus the laptop computer is advantageous in that a wider touch pad may be used in comparison with the case in which the touch pad and the click button are separated. However, because the cursor of the mouse is moved even in a case in which the user touches the surface of the click button, a malfunction such as a movement of the cursor of the mouse in an inadvertent direction or inappropriate clicking may occur when the user moves the cursor and clicks the button at the same time.

In addition, among the laptop computers in the related art, there is a laptop computer in which a click button of a mouse is implemented as a dome switch. The dome switch is provided with a predetermined sealing member, and the sealing member may be used to prevent moisture and other contaminants from permeating into the dome switch. Because the dome switch is made of a flexible material, performance of the dome switch may deteriorate due to frequent use, and the sealing member may also be damaged due to frequent use. For this reason, there is a problem in that contaminants permeate into the dome switch due to the damage to the sealing member and the dome switch does not properly operate.

DISCLOSURE

Technical Problem

An object of the present disclosure is to provide a touch pad device capable of sensing a push or pressure of an object inputted to a touch pad cover, and a portable computer including the same.

Technical Solution

A touch pad device according to one embodiment includes: a touch pad cover; a substrate disposed under the touch pad cover and including a pressure sensor; and a frame configured to support the substrate, in which a magnitude of a pressure inputted to the touch pad cover is detected on the basis of a change in electrical characteristics outputted from the pressure sensor in response to bending of the substrate.

A portable computer according to another embodiment includes: a display part having a screen on which a pointer is displayed; a main body part including a keyboard and a deck disposed at one side of the keyboard and having an opening; and a touch pad device disposed on the main body part, in which the touch pad device includes: a touch pad cover disposed in the opening of the deck; a substrate disposed under the touch pad cover and including a pressure sensor; and a frame configured to support the substrate, and in which a magnitude of a pressure inputted to the touch pad cover is detected on the basis of a change in electrical characteristics outputted from the pressure sensor in response to bending of the substrate.

Advantageous Effects

The use of the touch pad device according to the embodiment of the present disclosure is advantageous in sensing a push or pressure of an object inputted to the touch pad cover. Therefore, there is an advantage in that there is no need for a separate component, for example, a dome switch for sensing a push of an object. Further, there is an advantage in that manufacturing costs may be reduced.

DESCRIPTION OF MAIN REFERENCE NUMERALS OF DRAWINGS

100: Portable computer
110: Main body part
170: Display part
190: Hinge part
250: Touch pad cover

MODE FOR INVENTION

The following detailed description of the present disclosure will be made with reference to the accompanying drawings illustrating specific embodiments for carrying out the present disclosure. These embodiments will be described in detail enough to carry out the present disclosure by those skilled in the art. It should be understood that various embodiments of the present disclosure are different from one another but need not be mutually exclusive. For example, particular shapes, structures, and characteristics described herein in respect to one embodiment may be implemented in other embodiments without departing from the spirit and scope of the present disclosure. In addition, it should be understood that the position or arrangement of each constituent element in the respective disclosed embodiments may be changed without departing from the spirit and scope of the present disclosure. Therefore, the following detailed description is not considered as having limited meanings, and the scope of the present disclosure, if adequately explained, is limited only by the appended claims as well as all the scopes equivalent to the appended claims. Like reference numerals in the drawings refer to the same or similar functions throughout several aspects.

Figure 1:
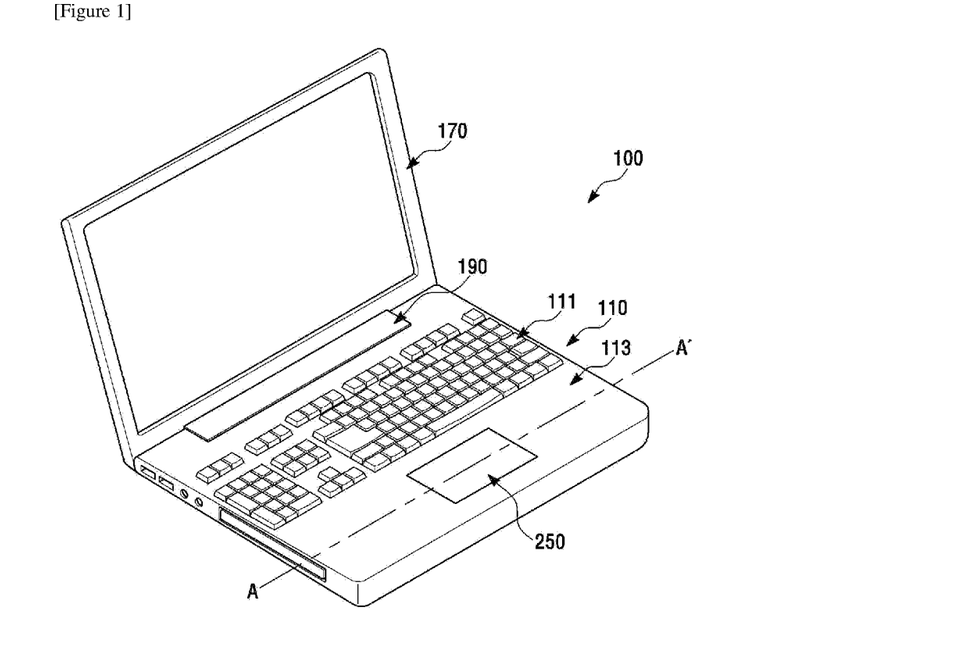
FIG. 1 is a perspective view illustrating an example of a portable computer including a touch pad device according to an embodiment of the present disclosure.

FIG. 1 is a perspective view illustrating an example of a portable computer including a touch pad device according to an embodiment of the present disclosure.

Referring to FIG. 1, a portable computer 100 according to an embodiment of the present disclosure includes a main body part 110, and a display part 170 rotatably connected to the main body part 110 and having a display panel on which a screen is displayed. The portable computer 100 may further include a hinge part 190 configured to hingedly connect the main body part 110 and the display part 170.

The main body part 110 may have, on an upper surface thereof, a keyboard 111 to which a predetermined instruction is inputted by a user, and a deck 113 provided at one side of the keyboard 111.

An LCD panel or an OLED panel may be used as the display panel of the display part 170, but the present disclosure is not limited thereto, and various panels may be applied.

The display part 170 may be rotatably operated about the hinge part 190, such that the display part 170 may be in close contact with the upper surface of the main body part 110 or unfolded.

Each of the main body part 110 and the display part 170 may be provided in the form of an approximately flat hexahedral plate. At the time of use of the portable computer 100, a bottom surface of the main body part 110 is placed on the floor.

Various types of electronic components and electronic devices, such as a main board, a memory, and a hard disc drive, may be provided in the main body part 110.

The portable computer 100 according to the embodiment of the present disclosure includes a touch pad device. The touch pad device includes a touch pad cover 250 illustrated in FIG. 1 and may further include various types of components disposed in the main body part 110.

The touch pad cover 250, which is an additional input means different from the keyboard 111, is disposed on a part of the deck 113 of the main body part 110. The touch pad cover 250 may be disposed in an opening formed in the deck 113.

An object such as a user's finger may come into contact with the touch pad cover 250. The touch pad device according to the embodiment of the present disclosure includes the touch pad cover 250, and a pointer displayed on the screen may be controlled by the touch pad device. In addition, the touch pad device may sense a pressure inputted to the touch pad cover 250 by an object.

As described above, the touch pad cover 250 and several components, which are disposed in the main body part 110 but not illustrated in FIG. 1, constitute the 'touch pad device'. The portable computer 100 according to the embodiment of the present disclosure, which has the touch pad device, may sense (detect) contact, a movement, and a predetermined pressure (or force) of the object inputted to the touch pad cover 250. Further, a specific function may be performed on the basis of a pressure sensed at a specific position.

In this case, the specific positions may include an upper left position, an upper right position, a lower left position, and a lower right position of the touch pad cover 250. Furthermore, the specific position may be a central portion of the touch pad cover 250. In addition, the specific position may be any position on the touch pad cover 250. Meanwhile, the specific function may be, but not limited to, a function corresponding to a left button or a right button of the mouse, for example, and a predetermined function may be determined depending on the user's setting.

Figure 2:
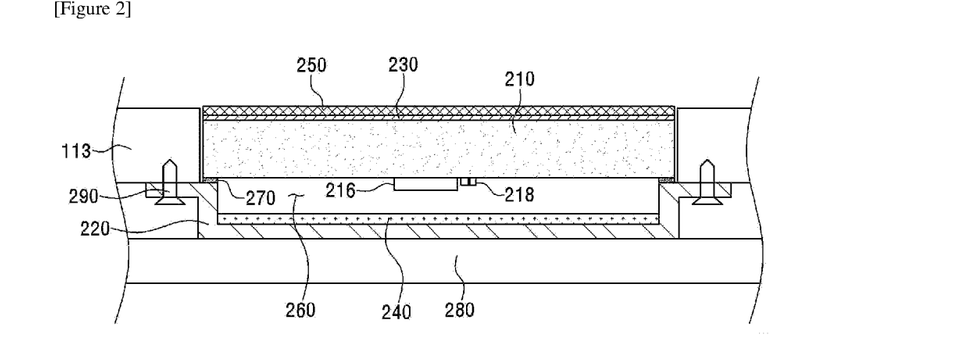
FIG. 2 is a cross-sectional view of the portable computer 100 taken along line A-A' in FIG. 1.

With reference to FIG. 2, the configuration in the main body part 110 will be more specifically described, and the touch pad device will be specifically described.

FIG. 2 is a cross-sectional view of the portable computer 100 taken along line A-A' in FIG. 1.

Referring to FIGS. 1 and 2, the portable computer 100 according to the embodiment of the present disclosure includes the touch pad device.

The touch pad device according to the embodiment of the present disclosure may include a substrate 210, a first bonding layer 230, the touch pad cover 250, a frame 220, a conductive layer 240, a gap part 260, a second bonding layer 270, a base member 280, and a fastening part 290.

For convenience of description, the base member 280 will be described first.

The base member 280 supports the frame 220 from below and is disposed in the portable computer 100 illustrated in FIG. 1.

The frame 220 is disposed on the base member 280 and may be mechanically fixed securely to the base member 280.

The frame 220 may be made of a non-conductive material. For example, the frame 220 may be a plastic frame.

The frame 220 has a structure capable of accommodating the conductive layer 240 therein. An edge portion of the frame 220 may be securely fixed to a bottom surface of the deck 113 by means of the fastening part 290.

The conductive layer 240 is made of a conductive material. The conductive layer 240 may electrically have predetermined potential. For example, the conductive layer 240 may have, but not limited to, ground potential, or the conductive layer 240 may have specific potential instead of the ground potential. In this case, the specific potential may be set to, but not limited to, one specific potential value, or for example, the specific potential may have a variable value like a driving signal having a potential value that varies over time.

In the case in which the conductive layer 240 has the ground potential, the conductive layer 240 may form magnetic capacitance together with a pressure sensor included in the substrate 210. The magnetic capacitance, which is formed on the basis of a distance between the conductive layer 240 and the pressure sensor, may be changed by the pressure of the object inputted to the touch pad cover 250. Further, an electrical signal including information on the amount of change in magnetic capacitance may be outputted from the pressure sensor and inputted to a touch IC 216. On the basis of the inputted electrical signal, the touch IC 216 may output a predetermined value corresponding to the pressure of the object inputted to the touch pad cover 250.

Meanwhile, in the case in which the conductive layer 240 has the specific potential instead of the ground potential, the conductive layer 240 may form mutual capacitance together with the pressure sensor included in the substrate 210. The mutual capacitance, which is an electrical characteristic formed on the basis of the distance between the conductive layer 240 and the pressure sensor, may be changed by the pressure of the object inputted to the touch pad cover 250. Further, an electrical signal including information on the amount of change in mutual capacitance may be outputted from the pressure sensor or the conductive layer 240 and inputted to the touch IC 216. On the basis of the inputted electrical signal, the touch IC 216 may output a predetermined value corresponding to the pressure of the object inputted to the touch pad cover 250.

When the information including the amount of change in capacitance in accordance with the change in distance between the pressure sensor and the conductive layer 240 is outputted, as a predetermined electrical signal, from the pressure sensor or the conductive layer 240 and inputted to the touch IC 216 as described above, the touch IC 216 may detect a magnitude of the pressure of the object inputted to the touch pad cover 250 on the basis of the inputted electrical signal.

The conductive layer 240 is disposed on the frame 220 and may be disposed to be spaced apart, at a predetermined distance, from the pressure sensor included in the substrate 210. The information on the amount of change in capacitance in accordance with the change in distance between the pressure sensor and the conductive layer 240 may be outputted, as a predetermined electrical signal, from the pressure sensor or the conductive layer 240. The outputted electrical signal may be inputted to the touch IC 216, and the touch IC 216 may sense the pressure on the basis of the inputted electrical signal.

The gap part 260 may be formed between the conductive layer 240 and the substrate 210. The gap part 260 may be filled with air or a cushion. In addition, a part of the gap part 260 may be filled with the cushion, and the remaining part of the gap part 260 may be filled with the air.

Meanwhile, the conductive layer 240 may not be necessary in a case in which the pressure sensor is a strain gauge. Therefore, it should be noted that the conductive layer 240 may not be an essential component of the touch pad device according to the embodiment of the present disclosure. In the case in which the pressure sensor is a strain gauge, the strain gauge is deformed as the substrate 210 is bent or pushed, and a resistance value, which is an electrical characteristic of the strain gauge, may be changed in accordance with the deformation of the strain gauge. The magnitude of the pressure may be calculated on the basis of the change in resistance value.

The substrate 210 is disposed on the frame 220 and may include a touch sensor (or a 2D sensor). The touch sensor included in the substrate 210 may be disposed on, but not limited to, an upper surface of the substrate 210. In the case in which the substrate 210 has a multilayered structure, the touch sensor may be disposed on any one of upper and lower surfaces of any one of the multiple layers.

The substrate 210 may have a single layered structure or a multilayered structure, and the touch IC 216 and an electronic component 218 may be mounted on a lower surface of the substrate 210.

The substrate 210 may include the pressure sensor (a 3D sensor). The pressure sensor included in the substrate 210 may be disposed on, but not limited to, the lower surface of the substrate 210, or the pressure sensor may also be disposed on the upper surface of the substrate 210. In addition, in the case in which the substrate 210 has the multilayered structure, the pressure sensor may be disposed on any one of upper and lower surfaces of any one of the multiple layers.

The touch IC 216 and the electronic component 218 may be mounted on the substrate 210. The touch IC 216 and the electronic component 218 may be mounted on the lower surface of the substrate 210.

The touch pad cover 250 is disposed on the substrate 210. An upper surface of the touch pad cover 250 is exposed to the outside. The touch pad cover 250 is disposed in the opening (not illustrated) formed in the deck 113.

In this case, the substrate 210, together with the touch pad cover 250, may be disposed in the opening (not illustrated) formed in the deck 113.

The first bonding layer 230 may be disposed between the substrate 210 and the touch pad cover 250. The first bonding layer 230 may be disposed between the substrate 210 and the touch pad cover 250 to the extent that the substrate 210 and the touch pad cover 250 are not separated from each other. Therefore, the first bonding layer 230 may be disposed at a specific portion such as an edge.

The second bonding layer 270 may be disposed between the substrate 210 and the frame 220. The second bonding layer 270 may be disposed on a part or the entirety of an edge portion of the substrate 210.

Hereinafter, an example of the touch pad device according to the embodiment of the present disclosure will be described with reference to FIGS. 3 to 5.

Figure 3:
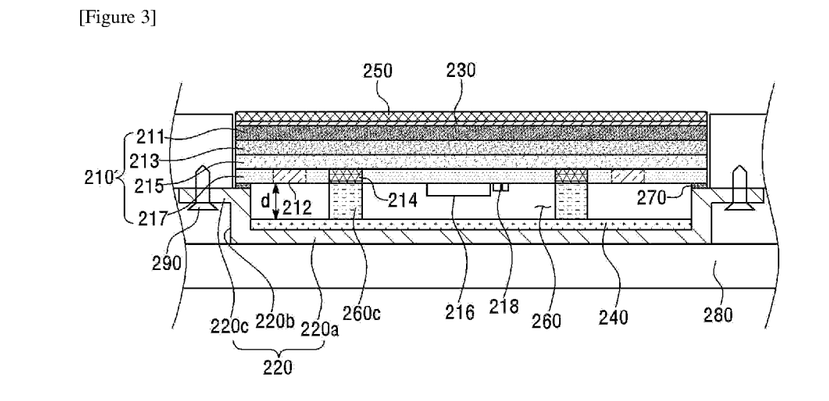
FIG. 3 is a cross-sectional view illustrating an example of the touch pad device according to the embodiment of the present disclosure.
Figure 4:
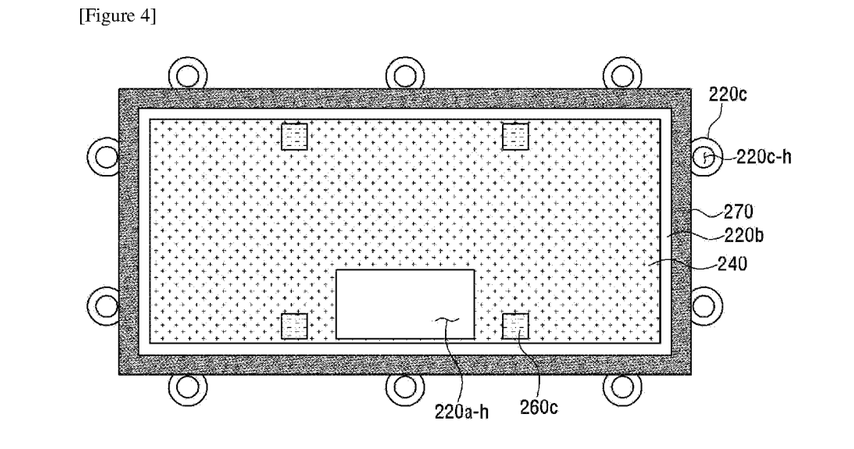
FIG. 4 is a top plan view illustrating a frame 220 illustrated in FIG. 3 when viewed from above.
Figure 5:
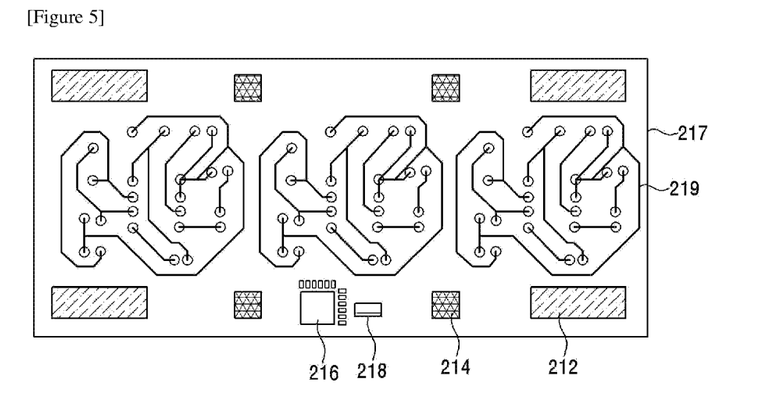
FIG. 5 is a top plan view illustrating a substrate 210' illustrated in FIG. 3 when viewed from below.

FIG. 3 is a cross-sectional view illustrating an example of the touch pad device according to the embodiment of the present disclosure, FIG. 4 is a top plan view illustrating the frame 220 illustrated in FIG. 3 when viewed from above, and FIG. 5 is a top plan view illustrating a substrate 210' illustrated in FIG. 3 when viewed from below.

In FIGS. 3 to 5, a component identical to the component illustrated in FIG. 2 is denoted by the same reference numeral. Therefore, for convenience of description, a specific description of the component denoted by the same reference numeral is substituted with the above-mentioned description.

Referring to FIGS. 3 and 4, the frame 220 may include a base frame 220*a*, a side frame 220*b*, and an edge frame 220*c*.

The base frame 220a is disposed on the base member 280. A lower surface of the base frame 220a may be in contact with an upper surface of the base member 220, and the conductive layer 240 may be disposed on an upper surface of the base frame 220a.

As illustrated in FIG. 4, the base frame 220a may have an opening portion 220a-h. Therefore, the conductive layer 240 may also have an opening portion corresponding to the opening portion 220a-h. The touch IC 216 and the electronic component 218 mounted on the lower surface of the substrate 210' may be disposed in the opening portion 220a-h.

The conductive layer 240 is disposed on the base frame 220a, and the conductive layer 240 may have ground potential. In order for the conductive layer 240 to have the ground potential, the conductive layer 240 may be electrically connected to a ground pad 214 of the substrate 210' through a conductive cushion 260c so as to have the ground potential. However, the present disclosure is not limited thereto, the conductive layer 240 may be electrically connected to other external components in the portable computer 100 so as to have the ground potential.

The side frame 220b may extend upward from an edge portion of the base frame 220a. A space capable of accommodating the conductive layer 240 may be provided in the frame 220 by the side frame 220b. An extension length of the side frame 220b is greater than a thickness of the conductive layer 240. A predetermined spacing distance may be formed between the conductive layer 240 and the substrate 210' by the side frame 220b.

The edge frame 220c may extend outward from the side frame 220b. As illustrated in FIG. 4, the edge frame 220c may extend outward or in a horizontal direction from a plurality of portions of the side frame 220b.

The edge frame 220c is coupled to the bottom surface of the deck 113. To this end, the edge frame 220c may have fastening holes 220c-h. The fastening part 290 such as a screw is fitted into the fastening hole 220c-h, and the fastening part 290 is thread-coupled to the bottom surface of the deck 113, such that the edge frame 220c may be securely coupled to the deck 113.

The substrate 210' is disposed on the frame 220. An edge region of the bottom surface of the substrate 210' may be disposed on the side frame 220b of the frame 220. In this case, in some instances, the edge region of the bottom surface of the substrate 210' may also be disposed on the edge frame 220c of the frame 220.

The second bonding layer 270 may be disposed between the frame 220 and the edge region of the bottom surface of the substrate 210'. The second bonding layer 270 may be a double-sided adhesive tape (DAT). The second bonding layer 270 may be disposed on the side frame 220b of the frame 220. In some instances, the second bonding layer 270 may also be disposed on a part of the base frame 220a or a part of the edge frame 220c.

The substrate 210' is disposed in the opening (not illustrated) formed in the deck 113. Therefore, a size and a shape of the substrate 210' may correspond to a size and a shape of the opening (not illustrated) of the deck 113. In order to ensure design tolerance, the size of the substrate 210' may be slightly smaller than the size of the opening (not illustrated) of the deck 113.

The touch IC 216 and the electronic component 218 may be mounted on the bottom surface of the substrate 210'. The second bonding layer 270 may be disposed on the edge region of the bottom surface of the substrate 210', and the second bonding layer 270 may also be disposed on a part of the edge region of the bottom surface of the substrate 210'.

The touch pad cover 250 may be disposed on the substrate 210'. The first bonding layer 230 may be disposed between the upper surface of the substrate 210' and a lower surface of the touch pad cover 250. In this case, the first bonding layer 230 may be a double-sided adhesive tape (DAT).

The touch pad cover 250 is disposed in the opening (not illustrated) formed in the deck 113. Therefore, a size and a shape of the touch pad cover 250 may correspond to the size and the shape of the opening (not illustrated) of the deck 113. In order to ensure design tolerance, the size of the touch pad cover 250 may be slightly smaller than the size of the opening (not illustrated) of the deck 113. In order to allow the user to easily recognize a position of the touch pad cover 250, the upper surface of the touch pad cover 250 may be disposed to be higher or lower than the upper surface of the deck 113.

The substrate 210' includes the touch sensor (or the 2D sensor) configured to detect that the object is in contact with the touch pad cover 250. The touch sensor may be, but not limited to, a capacitive touch sensor, or the touch sensor may be a pressure-sensitive touch sensor. The electrical signal outputted from the touch sensor is inputted to the touch IC 216, and the touch IC 216 may detect whether a touch is made and a motion of the touch. Information on whether a touch is made and the motion of the touch, which are detected, is transferred to a control unit (not illustrated) of the portable computer 100, and the control unit (not illustrated) may control the pointer displayed on the screen on the basis of the transferred information.

The substrate 210' includes the pressure sensor (or the 3D sensor) configured to detect a pressure (or force) applied to the touch pad cover 250 by an object. The pressure sensor outputs an electrical signal including information on the amount of change in capacitance in accordance with the change in distance from the conductive layer 240. The outputted electrical signal is inputted to the touch IC 216, and the touch IC 216 may output information on the pressure. The outputted information on the pressure is transferred to the control unit (not illustrated) of the portable computer 100, and the control unit (not illustrated) may control and allow a specific function to be performed at the position of the pointer displayed on the screen on the basis of the transferred information.

The substrate 210' has a multilayered structure. More specifically, the substrate 210' may include first to fourth layers 211, 213, 215, and 217. The first to fourth layers 211, 213, 215, and 217 may have a function of a wiring layer in common. Hereinafter, the respective layers will be described more specifically.

The first layer 211 has a touch pattern for the touch sensor. Therefore, the first layer 211 may also be named a touch sensor layer having a touch pattern. The first layer 211 may be a layer disposed at an upper end of the substrate 210'. The first layer 211 may be a layer having an upper surface being in contact with the first bonding layer 230.

The second layer 213 is disposed under the first layer 211. The second layer 213 may be a wiring layer having one or multiple wires. The second layer 213 may also be named a wiring layer.

The third layer 215 is disposed under the second layer 213. The third layer 215 may be a ground layer having ground potential and a function of the wiring layer having one or multiple wires. The reason why the third layer 215 has the ground potential is to implement an electric shield between the first layer 211 including the touch sensor and the fourth layer 217 including the pressure sensor 212. The third layer 215 may also be named a shield layer.

The fourth layer 217 is disposed under the third layer 215. The fourth layer 217 may be a layer disposed at a lower end of the substrate 210'. The touch IC 216 and the electronic component 218 such as an active or passive element may be mounted on a lower surface of the fourth layer 217. In addition, the fourth layer 217 may also serve as a wiring layer having predetermined wires 219.

The pressure sensor 212 may be mounted on the fourth layer 217. The plurality of pressure sensors 212 may be provided, and the plurality of pressure sensors 212 may be disposed on the lower surface of the fourth layer 217. Therefore, the fourth layer 217 may be named a pressure sensor layer.

Referring to FIG. 5, the plurality of pressure sensors 212 may be disposed on the lower surface of the fourth layer 217. In particular, the plurality of pressure sensors 212 may be disposed to be adjacent to respective edge portions of the lower surface of the fourth layer 217. However, the present disclosure is not limited thereto, and one or multiple pressure sensors 212 may be disposed on a central portion or any portion of the fourth layer 217 in accordance with design.

The pressure sensor 212 may be included in the fourth layer 217 of the substrate 210', but the present disclosure is not limited thereto. For example, the pressure sensor 212 may be formed on the lower surface of the substrate 210' or the lower surface of the fourth layer 217.

The pressure sensor 212 may be a predetermined conductive pattern formed directly on the lower surface of the fourth layer 217, or the pressure sensor 212 may be a sheet having an insulating layer formed on one surface or both surfaces of the conductive pattern.

The pressure sensor 212 may be electrically connected to the touch IC 216 through the wire in the substrate 210' and provided with a driving signal. In addition, the pressure sensor 212 is electrically connected to the touch IC 216 through the wire in the substrate 210' and may output a detection signal to the touch IC 216. In this case, in the case in which the conductive layer 240 has the ground potential, the pressure sensor 212 may be supplied with the driving signal in a first time section and may output the detection signal to the touch IC 216 in a second time section different from the first time section.

Meanwhile, although not illustrated separately in the drawing, in a case in which the conductive layer 240 has the specific potential instead of the ground potential, the pressure sensor 212 may be electrically connected to the touch IC 216 through the wire in the substrate 210' and provided with the driving signal, and thus the pressure sensor 212 may serve as a driving electrode. Alternatively, the pressure sensor 212 may be electrically connected to the touch IC 216 through the wire in the substrate 210' and may serve as a receiving electrode that outputs the detection signal to the touch IC 216.

Meanwhile, the pressure sensor 212 may be a strain gauge. The strain gauge is a device having an electrical resistance that varies in proportion to the amount of strain, and in general, a metal-coupled strain gauge may be used. A material, which may be used for the strain gauge, is a transparent material, and conductive polymer, polyethylenedioxythiophene (PEDOT), indium tin oxide (ITO), antimony tin oxide (ATO), carbon nanotubes (CNT), graphene, gallium zinc oxide, indium gallium zinc oxide (IGZO), tin oxide ($SnO_2$), indium oxide ($In_2O_3$), zinc oxide (ZnO), gallium oxide ($Ga_2O_3$), cadmium oxide (CdO), other doped metal oxide, piezoresistive elements, piezoresistive semiconductor materials, piezoresistive metal materials, silver nanowires, platinum nanowires, nickel nanowires, other metal nanowires, or the like may be used. As an opaque material, silver ink, copper, nano silver, carbon nanotubes (CNT), constantan alloy, karma alloy, doped polycrystalline silicon, doped amorphous silicon, doped single crystal silicon, other doped semiconductor materials, and the like may be used.

Figure 8A:
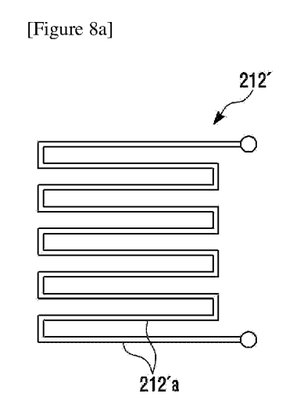
FIGS. 8A to 8C are views illustrating modified examples of a pressure sensor 212 in a case in which the pressure sensor 212 illustrated in FIGS. 3 and 5 is configured as a strain gauge.
Figure 8B:
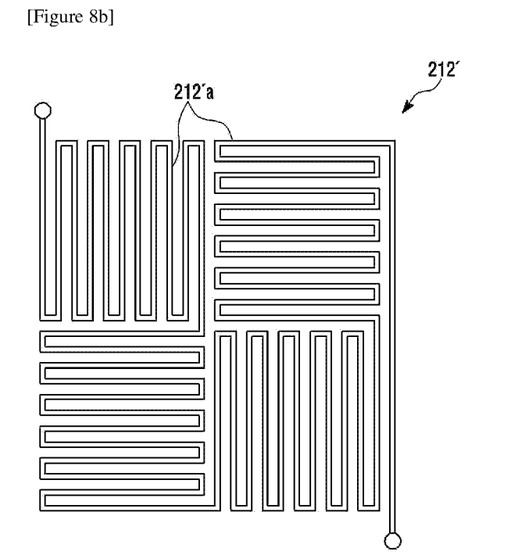
Figure 8C:
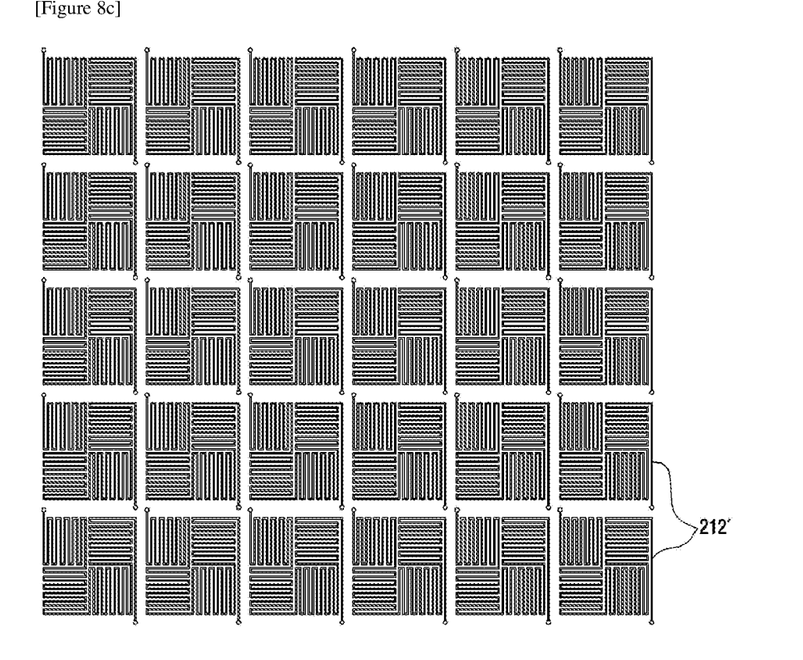

FIGS. 8A to 8C are views illustrating modified examples of the pressure sensor 212 in a case in which the pressure sensor 212 illustrated in FIGS. 3 and 5 is configured as a strain gauge.

Because a strain gauge 212' illustrated in FIG. 8A has a trace 212'a aligned in a horizontal direction, a length of the trace 212'a is greatly changed in response to horizontal deformation, such that the sensitivity to the horizontal deformation is high. However, because a length of the trace 212'a is relatively slightly changed in response to vertical deformation, such that the sensitivity to the vertical deformation is low.

As illustrated in FIG. 8B, the strain gauge 212' may include a plurality of fine regions, and directions in which the traces 212'a included in the respective fine regions are aligned may be different. Since the strain gauge 212' is configured to include the traces 212'a aligned in different directions, it is possible to reduce a difference in sensitivity of the strain gauges 212' to the deformation direction.

As illustrated in FIGS. 8A and 8B, a pressure sensor having a single channel may be implemented by the single strain gauge 212', or as illustrated in FIG. 8C, a pressure sensor having a plurality of channels may be implemented by the plurality of strain gauges 212'. By using the pressure sensor including the plurality of channels, it is possible to sense magnitudes of a plurality of pressures applied by a plurality of touches at the same time.

Referring back to FIG. 5, in the case in which the pressure sensor 212 is implemented by the strain gauge 212' illustrated in FIGS. 8A to 8C, the strain gauge is deformed as the substrate 210' is bent or pressed, and as a result, a resistance value, which is an electrical characteristic of the strain gauge, may be changed. The touch IC 216 may receive the change in resistance value, and the touch IC 216 may read out the received change in resistance value, thereby calculating the magnitude of the pressure. In this case, the conductive layer 240 may be excluded.

The fourth layer 217 may include the ground pad 214. For example, the ground pad 214 may be formed by selectively opening a part of a cover-lay layer of the substrate 210' so that a part of a conductive thin film, which is covered by the cover-lay layer, is exposed to the outside.

The ground pad 214 may be electrically connected to the conductive layer 240 by the conductive cushion 260c. That is, the conductive cushion 260c is disposed between the ground pad 214 and the conductive layer 240, such that the ground pad 214 and the conductive layer 240 may have equipotential. That is, the conductive layer 240 may have the ground potential.

The conductive cushion 260c may be disposed in the gap layer 260. In this case, the gap part 260 may be a gap filled with air. The conductive cushion 260c is made of a conductive material and disposed between the conductive layer 240 and the ground pad 214 of the substrate 210' to electrically connect the ground pad 214 and the conductive layer 240.

The conductive cushion 260c has a predetermined restoring force. When the substrate 210' is pressed by a pressure inputted to the touch pad cover 250, the substrate 210' is bent as the touch pad cover 250 is bent, and the conductive cushion 260c may be compressed corresponding to the bending of the substrate 210'. In this case, the conductive cushion 260c may mitigate impact applied to the substrate 210' by the pressure, thereby protecting the substrate 210'. Meanwhile, when the pressure to be inputted to the touch pad cover 250 is decreased or eliminated, the conductive cushion 260c generates restoring force for restoration to the original state, and the generated restoring force may assist in restoring the substrate 210' to the original state.

Figure 6:
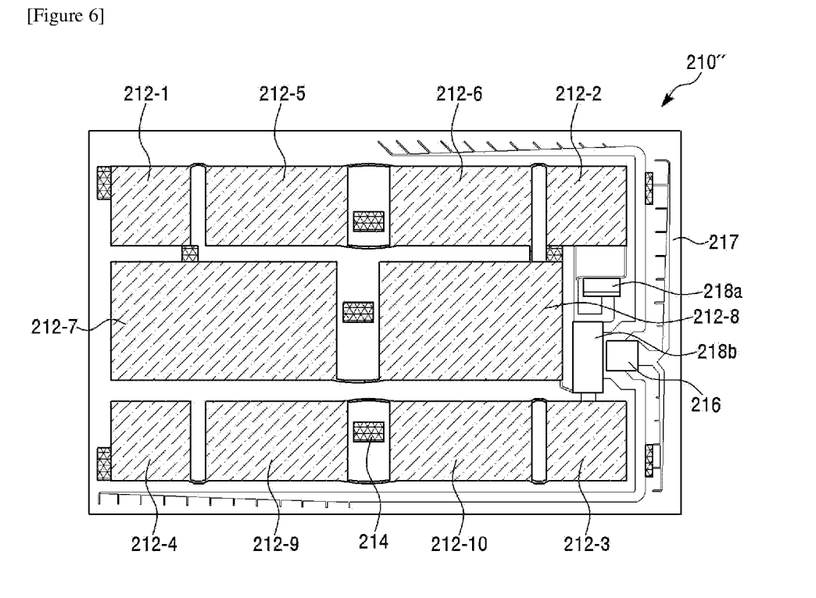
FIG. 6 is a top plan view illustrating a modified example of FIG. 5, that is, a modified example of the substrate 210' illustrated in FIG. 3 when viewed from below.

FIG. 6 is a top plan view illustrating a modified example of FIG. 5, that is, a modified example of the substrate 210' illustrated in FIG. 3 when viewed from below.

Referring to FIG. 6, the touch IC 216, electronic components 218a and 218b, a plurality of pressure sensors 212-1, 212-2, . . . , and 212-10, and a plurality of ground pads 214 may be mounted or disposed on a substrate 210".

The substrate 210" may include a bottom surface on which the touch IC 216 and the electronic components 218a and 218b are mounted. In this case, the bottom surface of the substrate 210" may be the lower surface of the pressure sensor layer 217 including the pressure sensors.

The plurality of pressure sensors 212-1, 212-2, . . . , and 212-10 may be disposed on the bottom surface of the substrate 210". The plurality of pressure sensors 212-1, 212-2, . . . , and 212-10 may be connected to the touch IC 216 by wires formed on the substrate 210".

The plurality of pressure sensors 212-1, 212-2, . . . , and 212-10 may constitute a plurality of channels. For example, among the plurality of pressure sensors 212-1, 212-2, . . . , and 212-10, the first to fourth pressure sensors 212-1, 212-2, 212-3, and 212-4, which are disposed at respective edge portions of the bottom surface of the substrate 210", may independently constitute four channels, and the remaining pressure sensors 212-5, . . . , and 212-10 may be electrically connected to one another by the wires to constitute a single channel. In this case, the remaining pressure sensors 212-5, . . . , and 212-10 may constitute two or more channels in accordance with design. Therefore, the plurality of pressure sensors 212-1, 212-2, . . . , and 212-10 may constitute at most ten channels. The number of channels may further increase in accordance with the number of pressure sensors 212-1, 212-2, . . . , and 212-10.

The plurality of pressure sensors 212-1, 212-2, . . . , and 212-10 may have an equal size or shape or have different sizes or shapes. Alternatively, some of the pressure sensors may have an equal size or shape, and the remaining pressure sensors may have different sizes or shapes.

The plurality of ground pads 214 may be formed on the bottom surface of the substrate 210". For example, the ground pad 214 may be formed by selectively opening a part of a cover-lay layer of the substrate 210" so that a part of a conductive thin film, which is covered by the cover-lay layer, is exposed to the outside.

The ground pad 214 may be electrically connected to the conductive layer 240 illustrated in FIGS. 3 and 4 by the conductive cushion 260c illustrated in FIGS. 3 and 4. That is, the conductive cushion 260c is disposed between the ground pad 214 and the conductive layer 240, such that the ground pad 214 and the conductive layer 240 may have equipotential. That is, the conductive layer 240 may have the ground potential.

The plurality of ground pads 214 may be disposed between the plurality of pressure sensors 212-1, 212-2, . . . , and 212-10, respectively, and may have an equal size or shape or different sizes or shapes.

Figure 7A:
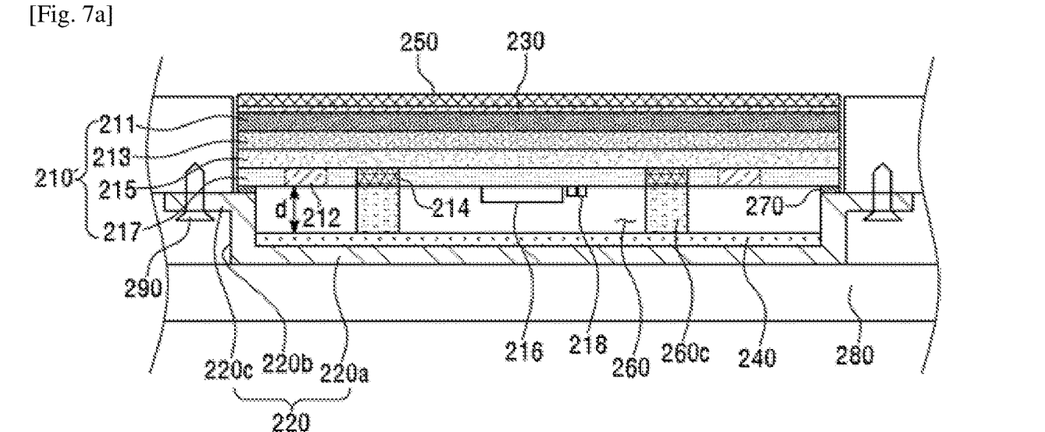
FIG. 7A is a view illustrating the touch pad device according to the embodiment of the present disclosure illustrated in FIG. 3.
Figure 7B:
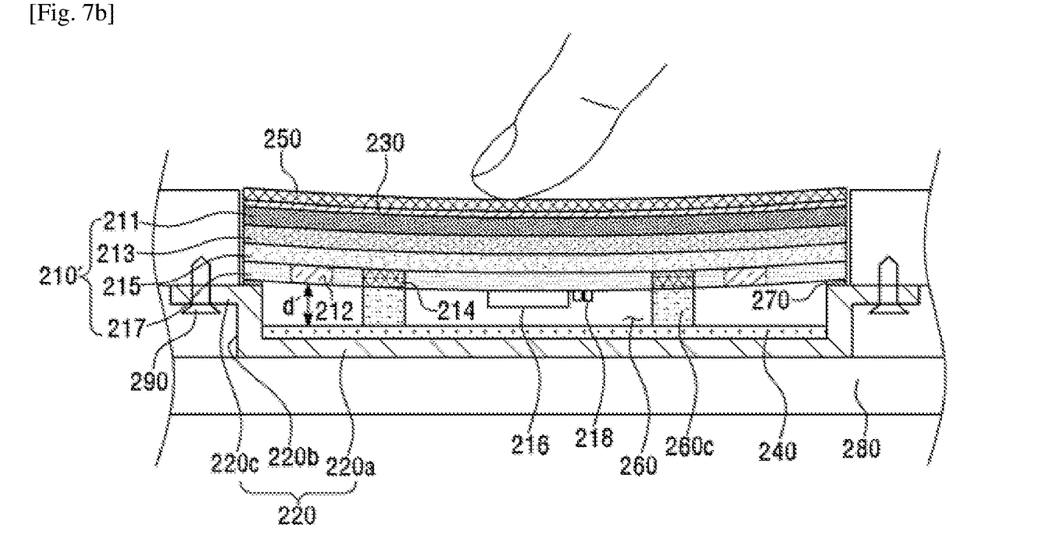
FIG. 7B is a view illustrating a case in which a touch pad cover 250 illustrated in FIG. 7A is pressed by a predetermined object.

FIG. 7A is a view illustrating the touch pad device according to the embodiment of the present disclosure illustrated in FIG. 3, and FIG. 7B is a view illustrating a case in which the touch pad cover 250 illustrated in FIG. 7A is pressed by a predetermined object.

Referring to FIG. 7B, when a specific portion of the touch pad cover 250 is pressed by a predetermined object, the touch pad cover 250 is bent downward about a portion to which a force is applied. Therefore, the substrate 210' attached to the touch pad cover 250 by the first bonding layer 230 is also bent. In this case, for convenience of description, FIG. 7B illustrates that the object presses the central portion of the touch pad cover 250. However, the present disclosure is not limited thereto, and the object may press one side of the touch pad cover 250.

As the substrate 210' is bent, a distance d between the conductive layer 240 and the pressure sensor 212 included in the substrate 210' illustrated in FIG. 7A is changed to as illustrated in FIG. 7B.

When the distance between the pressure sensor 212 and the conductive layer 240 is changed, capacitance between the pressure sensor 212 and the conductive layer 240 is changed, and a predetermined electrical signal including information on the amount of change in capacitance is outputted from the pressure sensor 212. The outputted electrical signal is inputted to the touch IC 216, and the touch IC 216 may output a predetermined value corresponding to the inputted electrical signal.

Meanwhile, in the case in which the pressure sensor 212 is a strain gauge, the pressure sensor 212 is deformed by the bending of the substrate 210', and a predetermined electrical signal including information on the amount of change in resistance value in accordance with the deformation of the pressure sensor 212 is outputted from the pressure sensor 212. The outputted electrical signal is inputted to the touch IC 216, and the touch IC 216 may output a predetermined value corresponding to the inputted electrical signal.

The predetermined value outputted from the touch IC 216 may be a digital value. The predetermined digital value outputted from the touch IC 216 may be provided to the control unit of the portable computer 100. Meanwhile, when the outputted digital value is equal to or larger than a preset reference value (or larger than a reference value), the touch IC 216 may determine a touch of an object inputted to the touch pad cover 250 as a pressure touch. Further, information on whether a touch is determined as a pressure touch (hereinafter, referred to as 'pressure touch information') may be provided to the control unit of portable computer 100.

On the basis of the pressure touch information or the digital value inputted from the touch IC 216, the control unit of the portable computer 100 may control and perform a predetermined specific function at a corresponding position of the pointer displayed on the screen of the portable computer 100. For example, the function, which is performed when the left or right button of the mouse is pressed, may be performed.

The features, structures, effects, and the like described above in the embodiments are included in one embodiment of the present disclosure, but the present disclosure is not necessarily limited to one embodiment. Furthermore, the features, structures, effects, and the like described in the respective embodiments may be combined or modified and then carried out by those skilled in the art as other embodiments. It should be interpreted that the combination and modification are included in the scope of the present disclosure.

In addition, the embodiments have been described above, but the embodiments are just illustrative and not intended to limit the present disclosure. It can be appreciated by those skilled in the art that various modifications and alterations, which are not described above, may be made without departing from the intrinsic features of the present disclosure. For example, the respective constituent elements specifically described in the embodiments may be modified and then carried out. Further, it should be interpreted that the differences related to the modifications and alterations are included in the scope of the present disclosure defined by the appended claims.

The invention claimed is:

1. A touch pad device comprising:
a touch pad cover;
a substrate disposed under the touch pad cover and comprising a pressure sensor; and
a frame configured to support the substrate,
wherein a magnitude of a pressure inputted to the touch pad cover is detected on the basis of a change in electrical characteristics outputted from the pressure sensor in response to bending of the substrate,
wherein a touch IC for detecting the magnitude of the pressure and an electronic component are mounted on the lower surface of the substrate,
wherein the substrate includes:
a touch sensor layer disposed under the touch pad cover;
a wiring layer disposed under the touch sensor layer;
a shielding layer disposed under the wiring layer; and
a pressure sensor layer disposed under the shielding layer,
wherein the touch IC, the electronic component, the pressure sensor, and a ground pad are disposed on a lower surface of the pressure sensor layer,
wherein the touch pad device further comprises:
a conductive layer disposed on the frame; and
a conductive cushion disposed in a gap layer between the substrate and the conductive layer, wherein the conductive cushion connects the ground pad and the conductive layer,
wherein the conductive cushion is compressed corresponding to the bending of the substrate, and
wherein the conductive cushion has a restoring force to restore the substrate to its original state.

2. The touch pad device of claim 1,
wherein the conductive layer, is spaced apart from the pressure sensor at a predetermined interval, and is accommodated in the frame.

3. The touch pad device of claim 2, wherein the conductive layer has ground potential.

4. The touch pad device of claim 2, wherein the conductive layer has a potential value that varies over time.

5. The touch pad device of claim 1, wherein at least the plurality of pressure sensors is disposed on a lower surface of the substrate, and the plurality of pressure sensors constitutes at least two or more channels.

6. The touch pad device of claim 1, wherein the frame comprises:
a base frame;
a side frame extending upward from an edge region of the base frame; and
an edge frame extending laterally from an end of the side frame, and
wherein an edge region of the substrate is disposed on the side frame.

7. A portable computer comprising:
a display part having a screen on which a pointer is displayed;
a main body part comprising a keyboard and a deck disposed at one side of the keyboard and having an opening; and
a touch pad device disposed on the main body part,
wherein the touch pad device comprises:
a touch pad cover disposed in the opening of the deck;
a substrate disposed under the touch pad cover and comprising a pressure sensor; and
a frame configured to support the substrate, and
wherein a magnitude of a pressure inputted to the touch pad cover is detected on the basis of a change in electrical characteristics outputted from the pressure sensor in response to bending of the substrate,
wherein a touch IC for detecting the magnitude of the pressure and an electronic component are mounted on the lower surface of the substrate,
wherein the substrate includes:
a touch sensor layer disposed under the touch pad cover;
a wiring layer disposed under the touch sensor layer;
a shielding layer disposed under the wiring layer; and
a pressure sensor layer disposed under the shielding layer,
wherein the touch IC, the electronic component, the pressure sensor, and a ground pad are disposed on a lower surface of the pressure sensor layer,
wherein the touch pad device further comprises:
a conductive layer disposed on the frame; and
a conductive cushion disposed in a gap layer between the substrate and the conductive layer,
wherein the conductive cushion connects the ground pad and the conductive layer.
wherein the conductive cushion is compressed corresponding to the bending of the substrate, and
wherein the conductive cushion has a restoring force to restore the substrate to its original state.

8. The portable computer of claim 7, wherein the conductive layer is spaced apart from the pressure sensor at a predetermined interval, and accommodated in the frame.

9. The portable computer of claim 8, wherein the conductive layer has ground potential.

10. The portable computer of claim 8, wherein the conductive layer has a potential value that varies over time.

11. The portable computer of claim 7, wherein at least the plurality of pressure sensors is disposed on a lower surface of the substrate, and the plurality of pressure sensors constitutes at least two or more channels.

12. The portable computer of claim 7, further comprising:
a base member configured to support the touch pad device,
wherein the frame comprises:
a base frame fixed to the base member;
a side frame extending upward from an edge region of the base frame; and
an edge frame extending laterally from an end of the side frame and coupled to a lower surface of the deck by a fastening part, and
wherein an edge region of the substrate is disposed on the side frame.

* * * * *